June 6, 1961  J. M. CHAFIN  2,986,737
WORK POSITIONING GUIDE
Filed Jan. 5, 1959  2 Sheets-Sheet 1
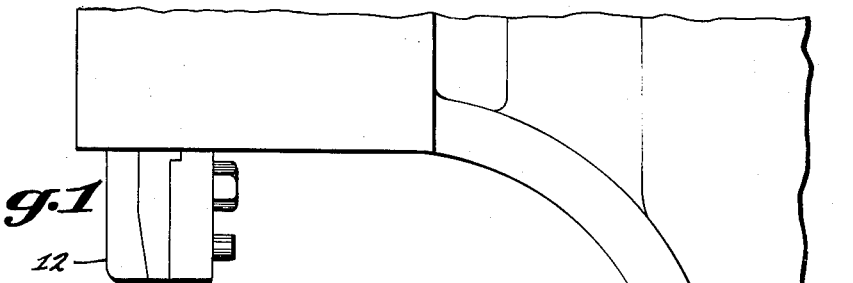
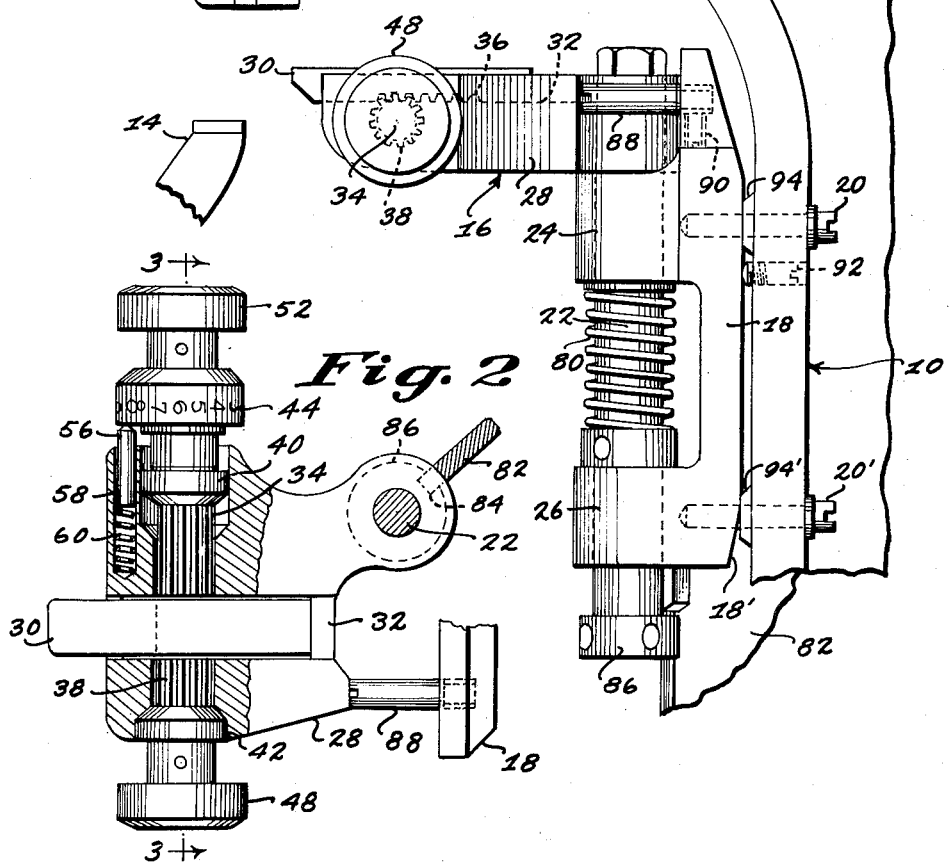
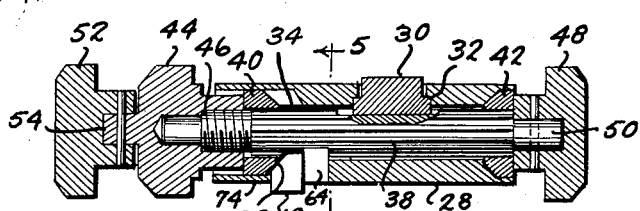
INVENTOR.
JAMES M. CHAFIN
BY
Parrott & Richards
ATTORNEYS

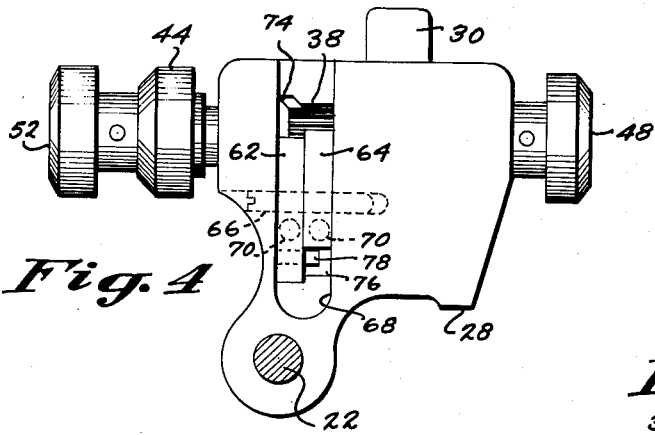
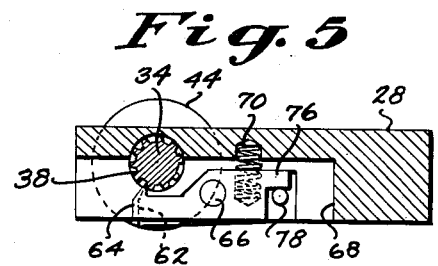
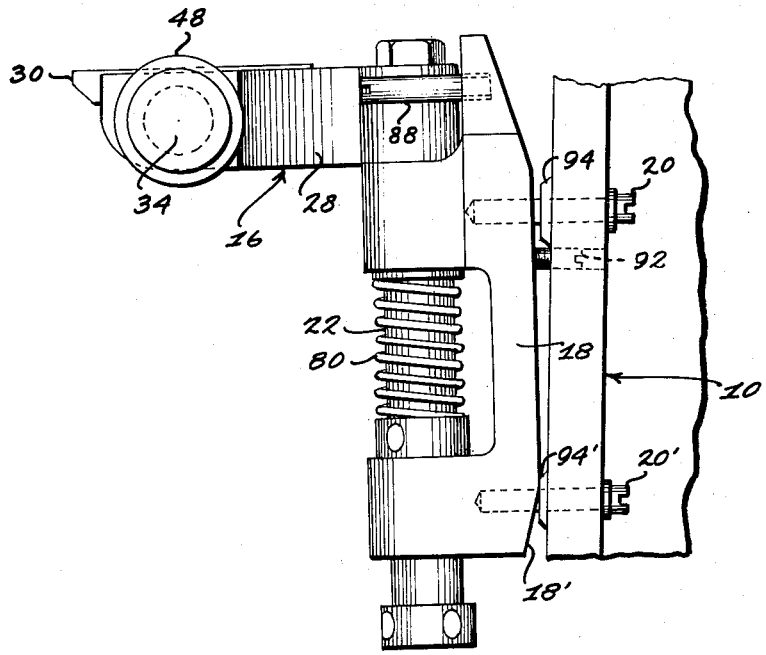

United States Patent Office 2,986,737
Patented June 6, 1961

2,986,737
WORK POSITIONING GUIDE
James M. Chafin, Atlanta, Ga., assignor to The Auto-Soler Company, a corporation of Georgia
Filed Jan. 5, 1959, Ser. No. 784,980
4 Claims. (Cl. 1—19)

This invention relates to guide means for positioning work in relation to a machine operation or the like, and more particularly to an improved form of work positioning guide in which provision is made to exceptional advantage for adjusting and stabilizing the guide means for active work guiding use while still maintaining the guide means readily retractable to an inactive position.

The improved work positioning guide of the present invention is of the type disclosed in U.S. Letters Patent No. 2,602,926 and No. 2,315,382, and is adapted primarily for use in fastener forming and inserting machines such as are illustrated and described in those prior patent disclosures. Briefly described, this type of work positioning guide comprises an extending guide arm arranged for sliding adjustment to dispose the extending end thereof for guiding work in relation to the fastener inserting head of the machine with which it is associated, the guide arm being further carried so that it may be pivoted or displaced readily from its active work guiding disposition to a retracted inactive position allowing work to be handled otherwise at the operating head without interference by the guide means.

An example of the sort of work for which the guide means of the present invention can be used effectively and advantageously is the replacement of worn top lifts on the heels of ladies' shoes, where the new top lift material must be attached by fasteners inserted in a heel body that is commonly very slender and accordingly requires a finely adjusted and stable positioning for proper insertion of the fasteners. The guide means provided according to the present invention is arranged to afford such fine adjustment and stable positioning, and further to allow initial alignment and leveling of the guide means readily, all as described in further detail below in connection with the accompanying drawings, in which:

FIG. 1 is a fragmentary side elevation illustrating the arrangement of the operating head of a fastener forming and inserting machine with a work positioning guide embodying the present invention provided in relation thereto;

FIG. 2 is a top plan detail, partly sectioned, illustrating the arrangement of the extending guide arm of the work positioning guide shown in FIG. 1;

FIG. 3 is a section detail taken substantially along the line 3—3 in FIG. 2;

FIG. 4 is a bottom plan detail corresponding generally to FIG. 2;

FIG. 5 is a further section detail taken substantially at the line 5—5 in FIG. 3; and FIG. 6 is a further fragmentary side elevation showing the work positioning guide in general correspondence with FIG. 1, but with the provision for leveling adjustment thereof exaggerated.

Referring now in detail to the drawings, and in particular at first to FIG. 1, the frame for a fastener forming and inserting machine of the type disclosed by the above noted prior patents is indicated generally by the reference numeral 10, with the operating head from which the fasteners are inserted illustrated at 12 and a related work supporting element shown fragmentarily at 14, and with a work positioning guide embodying the present invention indicated generally at 16 as attached at the throat portion of the machine frame 10 for guiding disposition in relation to the operating head 12 and work support 14.

As illustrated, the work positioning guide 16 comprises a first bracket member 18 attached to the machine frame 10, as by mounting studs at 20 and 20', and arranged to carry a pivot stud 22 vertically journaled thereon in spaced arm portions 24 and 26; the pivot stud 22 in turn carrying at its upper end a second bracket member 28 on which an extending guide arm 30 is slidably arranged for adjustment of its extending disposition to a desired guiding relation with respect to the operating head 12.

The slidable arrangement of the extending guide arm 30 is provided for by an undercut slideway 32 formed in the second bracket member 28, as further illustrated in FIGS. 2 and 3, and adjustment thereof is accomplished through a geared connection with an adjusting shaft 34 also carried by the second bracket member 28 for rotation and axial sliding movement with respect to an axis disposed transversely in relation to the sliding axis of guide arm 30. The geared connection for such adjustment comprises a rack portion 36 formed at the bottom face of guide arm 30 (see FIG. 1) for engagement by an elongated pinion portion 38 of adjusting shaft 34, press fitted bearing collars 40 and 42 being arranged on the adjusting shaft 34 for disposing it rotatably and slidably within the transverse bore provided therefor in the second bracket member 28.

The complete assembly of the adjusting shaft 34 on the second bracket member 28 further comprises an indicating dial knob 44 secured at a threaded end portion 46 of adjusting shaft 34, a manipulating knob 48 pinned at the other end portion 50 of adjusting shaft 34, a second comparable manipulating knob 52 pinned on an axial shank portion 54 of dial knob 44 so that the adjusting shaft 34 may be operated readily from either end, and a pin element 56 slidably housed in a bore 58 therefor formed in the second bracket member 28 and bottomed therein on a compression spring 60 so as to be urged outwardly against the adjacent inner side face of dial knob 44 to bias the adjusting shaft assembly normally at the position shown in FIGS. 2 and 3 and to serve further as an indicating pointer in relation to the dial knob 44.

The adjusting shaft assembly is also normally locked against rotation by first and second holding pawls 62 and 64 that are pivoted at a common axis intermediate their length (see FIGS. 4 and 5) on a pivot pin 66 extending across a bottom face clearance slot 68 arranged in the second bracket member for the holding pawls 62 and 64 which are disposed in staggered relation for alternately engaging the pinion portion 38 of adjusting shaft 34 at half pitch intervals so as to allow for fine adjustment of the locked position of adjusting shaft 34, and consequently of guide arm 30, while still employing a pinion portion 38 having a normal and easily formed pitch. Selective locking engagement of the staggered holding pawls 62 and 64 with the adjusting shaft pinion portion 38 is effected through bias springs 70 bearing downwardly from the second bracket member 28 on the respective pawls 62 and 64 at the side of pivot axis therefor opposite their holding ends.

To provide at the same time for displacement of the pawls 62 and 64 to release the adjusting shaft pinion portion 38 whenever it is desired to adjust the extending disposition of guide arm 30, the holding end of the first pawl 62 is formed with an inclined side face, as seen at 72 in FIG. 3, arranged in opposed relation to a beveled side face 74 of the adjacent adjusting shaft bearing collar 40, so that the bearing collar 40 acts in the nature of a cam element at inclined side face portion 72 of the first pawl 62 to displace the adjacent holding end of pawl 62 downwardly whenever the adjusting shaft assembly is moved slidably in the second bracket member 28 against the bias exerted thereon through the pin element 56 and bias spring 60 so that comparable simultaneous displacement of the second holding pawl 64 will also be effected, the remote end thereof is notched to form an extending lip portion 76 overlying a pin element 78 extending laterally from the adjacent end of the first holding pawl 62 and through which arrangement both pawls 62 and 64 are released by the camming action of the adjusting shaft bearing collar 40 while either is allowed to reengage the adjusting shaft pinion portion 38 when the guide arm adjustment has been completed and the adjusting shaft assembly is allowed to return to its normal biased position. When pawl 64 is engaged with the pinion portion 38, as seen in FIG. 3, the lip portion 76 thereof will immediately overlie the pin element 78 carried by the other pawl 62 (see FIG. 5) so that the bearing collar 40 can be made to act on pawl 62 to displace both pawls at once; while if it is pawl 62 that happens to be engaged, the pin element 78 thereon will necessarily be spaced somewhat below the overlying lip portion of pawl 64, and in this case the first action of bearing collar 40 on pawl 62 will be to displace it alone until the pin element 78 is raised against the lip portion 76 of pawl 64, after which displacement of both pawls will take place at once as in the first instance.

Beyond the foregoing provision for advantageously adjusting the extending disposition of guide arm 30, the work positioning guide 16 of the present invention, which is shiftable to a retracted inactive position, is also arranged to stabilize the guide structure at active work guiding position without in any way interfering with the ease of retraction. Provision for retraction of the guide structure is made in the manner of the previously noted prior patent disclosures by arranging a torsion spring 80 on the pivot stud 22 to act in relation to the first bracket member 18 for biasing the second bracket member 28 pivotally thereon toward retracted position, while a latching lever 82 is pivoted and biased on the first bracket member 18 for releasably engaging a key slot 84 (see FIG. 2) formed in a collar 86 on pivot stud 22 to hold the guide structure at its active work guiding position. Taken alone, however, such an arrangement necessarily allows some play in the latched guide structure because the key slot 84 must be formed with a sufficient tolerance to receive the latching lever 82 readily, and the tolerance necessary for this purpose, being situated closely adjacent the pivot axis of stud 22, is magnified considerably in the extending guide structure so as often to become objectionable. The lack of guiding disposition stability introduced in this manner is eliminated according to the present invention by fitting the first bracket member 18 with an adjustable abutment means, suitably an extending screw member 88 fixed in place by a set screw 90, spaced substantially from the axis of pivot stud 22 and located in the pivoting path of the second bracket member 28 so as to provide for setting a fixed abutment against which the guide structure is braced and stably supported after latching at active work guiding position.

In addition, provision is made for leveling the guide structure of the present invention readily by fitting the machine frame 10 with an adjustable abutment member, such as a set screw 92, at a disposition bearing on the adjacent face of the attached first bracket member 18 in vertically spaced relation with respect to a point of attachment thereof, such as 20', so as to allow for final leveling adjustment without requiring close initial machining of either the frame 10 or bracket member 18 for assembly. As illustrated in FIG. 1, the machine frame 10 is preferably formed with bosses 94 and 94' at which the first bracket member 18 is attached by the respective mounting studs 20 and 20', and FIG. 6 shows in exaggerated form the manner in which the guide structure can be set to a level disposition by the abutment member 92 when a fast seating on both the bosses 94 and 94' would be out of plumb. It should also be noted in this connection that the attached face of bracket member 18 is preferably relieved as illustrated at 18' in FIGS. 1 and 6 to a point intermediate the face of boss 94' to facilitate the relative shifting of bracket member 18 with respect to the machine frame 10 during leveling adjustment in the above described manner.

The operating manipulation of the above described guide means 16 provided according to the present invention is as follows. Assuming that the first bracket member 18 has been attached to the machine frame 10 with suitable adjustment of the abutment screw 92 for leveling the guide structure, and that the abutment screw 88 on mounting bracket 18 has likewise been suitably adjusted for stabilizing the guide structure at its active position as explained above, the inactive position of the guide structure, as determined by the torsion spring 80 when the latching lever 82 is displaced outwardly from the key slot 84, may be taken conveniently as a starting point. At this inactive position, the second bracket member 28 is pivoted about the pivot stud 22 by the torsion spring 80 so that the guide structure is retracted in relation to the work supporting element 14 to allow handling of work thereon without interference from the guide structure when it is not needed. Whenever it is desired to employ the guide structure at the work supporting element 14, however, it is only necessary to pivot the second bracket member 28 manually from its retracted position, against the force of the torsion spring 80, until the latching lever 82 is brought into alignment with the key slot 84 in pivot stud collar 86 for engagement thereat. Upon such engagement the second bracket member 28 will be brought into contact simultaneously with the adjusted abutment screw 88, which serves the purpose of effecting engagement of the latching lever 82 in closely fitted relation at only one side of the key slot 84 (i.e., the side of key slot 84 facing in the direction opposite to that in which the second bracket member 28 is shifted about pivot stud 22 to its active position), and the result is to stabilize the guide structure at its active position against any appreciable play, as previously explained above. When thus engaged at active position, the guide arm 30 carried by the second bracket member 28 is aligned with the work supporting element 14 for effective guiding disposition thereat. The particular guiding disposition desired for the guide arm 30 is obtained through either of the manipulating knobs 48 or 52 that are carried on adjusting shaft 34 which is geared through the elongated pinion portion 38 thereof with the rack portion 36 formed at the lower face of the guide arm 30. Rotation of either of these manipulating knobs 48 or 52 in a counter-clockwise direction, as seen in FIG. 1, results in extending the guide arm 30 in relation to the work supporting element 14, and the relative extension thus obtained is gauged by the indicating dial 44 also carried on the adjusting shaft 34. Upon extension to a desired guiding position in relation to the work supporting element 14, the guide arm 30 is held at this position by one or the other of the pawls 62 or 64 pivotally mounted on the second bracket member 28 for engagement in staggered relation with the pinion portion 38 of adjusting shaft 34 to lock the shaft 34 against clockwise rotation, as seen in FIGS. 1 and 5, and thereby hold the guide arm 30 against work guiding pressure applied at the extending end thereof; the staggered relation of the pawls 62 and 64 providing a fine adjustment of the extending disposition of guide arm 30 for work guiding action, as also previously explained above. In order to release an engaged pawl 62 or 64 so as to allow clockwise rotation of the adjusting shaft 34, as seen in FIG. 1, and thereby permit retraction of the guide arm 30, either for the purpose of obtaining a less extended work guiding position or retracting it temporarily in relation to the work supporting element 14 for clearance purposes, the adjusting shaft 34 is shifted axially to the right, as seen in FIG. 3, by manual pressure applied at either of the manipulating knobs 48 or 52 so as thereby to apply the beveled side of the adjusting shaft bearing collar 40 in camming relation at the complementary inclined side face portion 72 of the adjacent pawl 62, which has the effect of forcing downwardly the active ends of both pawls 62 and 64 through the interaction of lip element 76 and lateral pin 78 at the remote ends of pawls 64 and 62, respectively. The guide arm 30 may thereupon be retracted on the second bracket member 28 through clockwise rotation of the manipulating knobs 48 or 52, as seen in FIG. 1, while one or the other of the hold pawls 62 or 64 will return in locking engagement as soon as this retracting adjustment is completed and the adjusting shaft 34 is allowed to shift axially to the left for return to its normal position as seen in FIG. 3. The foregoing extension and retraction of the guide arm 30 may be repeated readily and conveniently as long as the guide structure is maintained at its active position, and the guide structure as a whole may be readily retracted to its inactive position whenever desired simply by releasing the latching lever 32 from the key slot 84 so that the guide structure is returned to the starting point selected above for describing its operating manipulation.

The present invention has been described in detail above for purposes of illustration only and is not intended to be limited by this description or otherwise except as defined in the appended claims.

I claim:

1. A work positioning guide comprising an extending guide arm, a bracket member carrying said guide arm slidably for adjustment of its extending disposition, an adjusting shaft also carried by said bracket member for rotation and for axial sliding movement with respect to an axis disposed transversely in relation to said guide arm, said shaft being connected in geared relation with said guide arm, first and second holding pawls pivoted on said bracket member at a common transverse axis intermediate the length thereof, said pawls extending in staggered relation and being biased for alternately engaging said geared connection between said shaft and guide arm at half pitch intervals, cam means carried by said shaft for displacing said first pawl upon sliding movement of said shaft, and means carried by said first pawl adjacent the end thereof remote from said shaft to apply displacing pressure at the remote end of said second pawl in the direction opposite to that in which said first pawl is displaced by said cam means, whereby both of said pawls are disengaged upon said sliding movement of said shaft to allow rotation thereof to adjust the extending disposition of said guide arm.

2. A work positioning guide comprising a first bracket member arranged for fixed mounting attachment, a pivot stud journaled on said first bracket member, a second bracket member fixed on said pivot stud, an extending guide arm carried on said second bracket member, means biasing said pivot stud for rotation with respect to said first bracket member to pivot said second bracket member and extending guide arm thereon to a retracted inactive position, means carried by said first bracket member adjacent said pivot stud for releasably locking said pivot stud against the bias thereon in a pivoted relation to said first bracket member disposing said second bracket member and the extending guide arm thereon at an active work guiding position, and adjustable abutment means carried on said first bracket member in substantially spaced relation with respect to the axis of said pivot stud and in the pivoting path of said second bracket member for stabilizing the active work guiding position of said extending guide arm when said pivot stud is locked against said bias by holding said pivot stud and second bracket member closely between the opposed positioning actions of said abutment means and said locking means.

3. A work positioning guide as defined in claim 2 and further characterized in that the arrangement for fixed mounting attachment of said first bracket member incorporates a second adjustable abutment means spaced vertically with respect to a point of attachment of said first bracket member for leveling the extending disposition of said guide arm by adjustment of the position in which said first bracket member is fixed upon mounting attachment.

4. In a machine for inserting fasteners in material to be secured, a guide means for positioning such material to have said fasteners inserted therein, said guide means comprising a first bracket member attached to said machine, a second bracket member pivoted about a vertical axis on said first bracket member, an extending guide arm slidably carried on said second bracket member for adjustment of the extending disposition thereof, means carried on said second bracket member for adjusting said extending disposition including a geared connection with said quide arm and displaceable first and second holding pawls biased for alternately engaging said geared connection at half pitch intervals, means adjacent the pivot axis of said second bracket member on said first bracket member interacting between said bracket members for selectively disposing said second bracket member and the extending guide arm thereon at pivotally spaced retracted inactive and active material positioning dispositions, adjustable abutment means substantially spaced on said first bracket member in relation to the pivot axis of said second bracket member thereon and located in the pivoting path of said second bracket member for stabilizing the active material positioning disposition of said extending guide arm by opposing closely the selective disposition of said second bracket member for active material positioning as determined by said last mentioned means and thereby eliminating play in the positioning action of said last mentioned means, and a second adjustable abutment means carried by said machine at a disposition bearing on said first bracket member in vertically spaced relation with respect to a point of attachment thereof for leveling the extending disposition of said guide arm.

References Cited in the file of this patent

UNITED STATES PATENTS

| | | |
|---|---|---|
| 595,556 | Buffum | Dec. 14, 1897 |
| 1,019,184 | Peterson | Mar. 5, 1912 |
| 1,276,694 | Reilly | Aug. 20, 1918 |
| 1,782,490 | Torgerson | Nov. 25, 1930 |
| 2,296,674 | Ingels | Sept. 22, 1942 |
| 2,315,382 | Ajouelo | Mar. 30, 1943 |
| 2,579,348 | Taylor | Dec. 18, 1951 |
| 2,602,926 | Wright | July 15, 1952 |
| 2,638,620 | Civitelli | May 19, 1953 |

FOREIGN PATENTS

| | | |
|---|---|---|
| 462,061 | Great Britain | Mar. 2, 1937 |